(12) United States Patent
Zhang et al.

(10) Patent No.: US 11,064,203 B2
(45) Date of Patent: Jul. 13, 2021

(54) SSIM-BASED RATE DISTORTION OPTIMIZATION FOR IMPROVED VIDEO PERCEPTUAL QUALITY

(71) Applicant: NVIDIA Corporation, Santa Clara, CA (US)

(72) Inventors: Megamus Zhang, Zhejiang (CN); Jant Chen, Shanghai (CN); Steven Feng, Jiangsu (CN); Shining Yi, Shanghai (CN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 15/918,761

(22) Filed: Mar. 12, 2018

(65) Prior Publication Data

US 2019/0281302 A1    Sep. 12, 2019

(51) Int. Cl.
    *H04N 19/147*    (2014.01)
    *H04N 19/159*    (2014.01)
    *H04N 19/176*    (2014.01)
    *H04N 19/105*    (2014.01)

(52) U.S. Cl.
    CPC ......... *H04N 19/147* (2014.11); *H04N 19/105* (2014.11); *H04N 19/159* (2014.11); *H04N 19/176* (2014.11)

(58) Field of Classification Search
    CPC .. H04N 19/147; H04N 19/105; H04N 19/159; H04N 19/176
    USPC .................................................... 375/240.02
    See application file for complete search history.

(56) References Cited

U.S. PATENT DOCUMENTS

| 8,989,276 B2* | 3/2015 | Bjoentegaard ....... | H04N 19/176 375/240.14 |
| 9,781,449 B2* | 10/2017 | Korman ............... | H04N 19/124 |
| 2008/0112481 A1* | 5/2008 | Hsaing ................. | H04N 19/109 375/240.03 |
| 2014/0101485 A1* | 4/2014 | Wegener ............. | H03M 7/3068 714/32 |

OTHER PUBLICATIONS

Wang et al., "SSIM-Motivated Rate-Distortion Optimization for Video Coding", IEEE Transactions on Circuits and Systems for Video Technology, vol. 22, No. 4, Apr. 2012, pp. 516-529.

(Continued)

*Primary Examiner* — Behrooz M Senfi
(74) *Attorney, Agent, or Firm* — Nixon & Vanderhye PC

(57) ABSTRACT

Real-time, hardware-implementable Structured Similarity (SSIM)-based rate distortion optimization (RDO) techniques for video transmission are described. The disclosed techniques provide efficient application of SSIM as a distortion metric in selecting prediction modes for encoding video for transmission. A prediction mode, at a high level, specifies which previously encoded group of pixels can be utilized to encode a subsequent block of pixels in a video frame. A less compute intensive distortion metric is first used to select a subset of candidate prediction modes. Then a more compute intensive SSIM-based selection is made on the subset. By utilizing the disclosed techniques during video encoding, tradeoffs between distortion and transmission rate can be made that are more relevant to human perception.

22 Claims, 11 Drawing Sheets

(56) References Cited

OTHER PUBLICATIONS

Wang et al., "Image Quality Assessment: From Error Visibility to Structural Similarity", IEEE Transactions on Image Processing, vol. 13, No. 4, Apr. 2004, pp. 1-14.
SZE et al., "High Efficiency Video Coding (HEVC)", Integrated Circuit and Systems, Algorithms and Architectures, Springer 39 (2014): 40, Section 11.6.3 Hardware-Oriented Two-Step RDO Algorithm.

* cited by examiner

```
int ssim_8x8(orig, rec) {
internal_precision_bits = 5; imeanOrg = 0; imeanEnc = 0; ivarOrg = 0; ivarEnc = 0; icovOrgEnc = 0;

for ( n = j;n < j + 8;n ++)
{
    for (m = i;m < i + 8;m ++)
    {
        imeanOrg   += orig[n*24 + m];
        imeanEnc   += rec[n*24 + m];
        ivarOrg    += orig[n*24 + m] * orig[n*24 + m];
        ivarEnc    += rec[n*24 + m] * rec[n*24 + m];
        icovOrgEnc += orig[n*24 + m] * rec[n*24 + m];
    }
} meanOrg = (imeanOrg<<internal_precision_bits) / 64 ;
meanEnc = (imeanEnc<<internal_precision_bits) / 64 ;

varOrg    = (((ivarOrg<<internal_precision_bits) - imeanOrg * meanOrg) / 64);
varEnc    = (((ivarEnc<<internal_precision_bits) - imeanEnc * meanEnc) / 64);
covOrgEnc = (((icovOrgEnc<<internal_precision_bits) - imeanOrg * meanEnc) / 64);

int64_t numurator = (int64_t(2 * meanOrg * meanEnc + C1) * int64_t(2 * covOrgEnc + C2))>>(3*internal_precision_bits);
int64_t denorm = (int64_t(meanOrg * meanOrg + meanEnc * meanEnc + C1) * int64_t(varOrg + varEnc + C2))>>(3*internal_precision_bits);
int dist = divHW((denorm-numurator)<<DIST_PRECISION_BITS, denorm);
dist = Clip3(0, (1<<(DIST_PRECISION_BITS+1))-1, dist);
return dist;
}
```

Fig. 9A

```
#define DIST_PRECISION_BITS 10
int divHW(int64_t z, int64_t d)
{
    if (d == 0)
        return -1;
    else if (z < d)
        return 0;
    int overflow = 0;

if ((z >> DIST_PRECISION_BITS) > d) {
        overflow = 1;
        z = z - (d << DIST_PRECISION_BITS);
    } int64_t s = z; //s0 = z
    int q = 0;
    for (int i = 0; i < DIST_PRECISION_BITS; i++) {
        s = (s << 1);
        if (s > 0)
            s -= (d << DIST_PRECISION_BITS);
        else
            s += (d << DIST_PRECISION_BITS);
        if(s >0 )
            q |= (1 << (DIST_PRECISION_BITS - i - 1));
    }
    return (overflow<< DIST_PRECISION_BITS) | q;
}
```

Fig. 9B

SSIM-BASED RATE DISTORTION OPTIMIZATION FOR IMPROVED VIDEO PERCEPTUAL QUALITY

FIELD

This technology relates to video transmission in general, and more particularly to improving the perceptual quality of transmitted video.

BACKGROUND AND SUMMARY

Video consumes substantial amounts of network bandwidth between transmitting computer systems and receiving computer systems, and may also consume substantial bandwidth in a computer system's internal interconnection networks. The amount of bandwidth required for transmitting a particular video stream is related to the quality of the video and/or encoding of the video. Transmitting video at quality levels higher than necessary may consume an unnecessarily high amount of bandwidth.

Many conventional video encoders operate by selecting an encoding mode that yields the highest quality image. The highest quality image typically requires a relatively high number of bits for encoding. However, in some cases, no significant improvement in the perceptual quality may be observed in the encoded image despite the larger numbers of bits used in encoding. In some cases, the encoder may be able to use fewer bits without significantly degrading the quality of the image the user perceives.

As a non-limiting example, the H.264 Advanced Video Compression Standard uses prediction to minimize the amount of data to be transmitted or stored. Instead of encoding each block of video as if it were the only block being encoded, an H.264 encoder leverages off of the encoding already performed on other blocks. Because parts of an image are often similar to other parts of the same image and/or to recent previous images, the encoder can try to predict image parts to be encoded using previously coded data. The encoder subtracts the current block from the prediction it has generated to form a difference. If the prediction is accurate, then the difference data will be much smaller than the data specifying the image part itself. This is like going to a diner with your friend for breakfast, your friend placing an elaborate breakfast order, and you saying "I'll have the same but with scrambled eggs instead of poached."

The better the prediction, the smaller the difference data. Because image blocks can be different in their characteristics, H.264 uses a number of different prediction modes to try to get the best prediction. Like a carpenter who reaches into his or her toolbox and picks out the best tool for the job, an H.264 encoder will try to pick the best prediction mode for the particular part of the image it is encoding. For example, an H.264 encoder has a toolbox containing 9 different prediction modes for 4×4 macroblock luma (brightness) prediction. Some of the nine prediction modes operate vertically, others operate horizontally, and others operate on diagonals. Some go from top to bottom or left to right, others go from bottom to top or from right to left. Some use extrapolation, others use averaging. Different prediction modes will yield different prediction results.

The H.264 encoder determines which prediction mode is the best one by testing the results. For example, a common test for the luma prediction modes is called "Sum of Absolute Errors". The encoder uses the test results to determine which prediction yields the lowest errors. See e.g., Richardson, The H.264 Advanced Compression Standard (2d. Ed., Wiley & Sons 2010), Chapter 6, incorporated herein by reference. While testing for the lowest absolute error will generally yield the highest quality image, there are instances where the user may not perceive a significant enough difference in image quality to justify using a more expensive (in terms of bit count) prediction mode. By way of analogy, a professional race car driver is often willing to spend the money to buy the highest performing drive train whereas a commuter is not going to notice much difference in performance between a high performance racing engine and a lower performance but more fuel efficient powertrain.

Rate-Distortion-Optimization (RDO) provides for optimizing the operation of a video encoder by avoiding such situations and for, instead of merely choosing an encoding mode that yields the highest quality, choosing to encode the video with a lower quality so that the bit rate can be improved. RDO provides for the coded video bit rate to be reduced by allowing some distortion in the video in order to achieve optimized video quality under certain rate constraints. The bit rate represents the amount of data required to encode the video, and the distortion represents the loss of video quality. Using RDO, the rate and distortion of the transmitted video can be controlled so that they lie between a first extreme of where the coded bit rate is set to a maximum rate at the cost of having some relatively high level of distortion, and a second extreme of where a maximum level of distortion is defined at the cost of a relatively low bit rate.

RDO is widely used in current video systems to minimize video distortion D (e.g., achieve best video quality) given a rate constraint $R_c$, for which the optimization problem can be formulated as:

$$\min\{D\}, s.t. R \leq R_c. \qquad \text{Equation 1}$$

In practice, the Lagrange multipliers method is used to convert the above constrained problem into unconstrained form:

$$\min\{J\}, J=D+\lambda^* R, \qquad \text{Equation 2}$$

where $\lambda$ is the Lagrange multiplier. $\lambda$ is usually dependent on the quantization parameter (QP) for the encoder.

Most conventional RDO techniques use the Sum of Squared Difference (SSD) for calculating the distortion metric. The SSD-RDO technique targets improving the perceptual signal to noise ratio (PSNR). However, many studies have shown that calculated PSNR metrics may often not correspond to human perception with sufficient accuracy.

SSIM (Structural Similarity) is a more recently proposed distortion metric which more closely corresponds to human visual perception. Wang, Zhou, et al. "*Image quality assessment: from error visibility to structural similarity.*" IEEE transactions on image processing 13.4 (2004): 600-612, the entire contents of which is incorporated herein by reference, provides a description of SSIM. Because of its high level of correspondence to actual human visual perception, SSIM is widely proposed for use throughout video distribution systems, including, for example, broadcast, cable and satellite television.

SSIM-RDO, in contrast to many conventional RDO techniques, uses a SSIM score as the distortion metric. Studies have shown that SSIM-RDO can yield better perceptual video quality than SSD-RDO under the same bitrate. As SSIM becomes more popular as a video quality metric, it is important to develop efficient hardware-implementable SSIM-RDO.

The approach provided by example non-limiting embodiments herein provide for efficient implementations of SSIM.

BRIEF DESCRIPTION OF THE DRAWINGS

The following detailed description of exemplary non-limiting illustrative embodiments is to be read in conjunction with the drawings of which:

FIGS. 9A and 9B illustrate example pseudo code for hardware implementation of a SSIM calculation according to an example embodiment.

DETAILED DESCRIPTION OF NON-LIMITING EXAMPLE EMBODIMENTS

Example embodiments provide for video transmission with optimized quality and rate by employing hybrid SSIM-RDO techniques. The hybrid SSIM-RDO techniques provide efficient implementations of SSIM as a distortion metric used in selecting prediction modes for encoding video for transmission. By using SSIM, which more closely corresponds to actual human perception, as the distortion metric, embodiments provide for optimizing the distortion versus rate tradeoff in ways that are most relevant to human perception. Moreover, embodiments enable SSIM to be hardware-implemented and thus capable of even higher speeds than that offered in software implementations.

Example embodiments address limitations of conventional RDO techniques. For example, in contrast to conventional techniques such as SSD-RDO, which use SSD as the distortion metric when selecting prediction modes for encoding video, that are known to poorly correspond to actual human perception, the hybrid SSIM-RDO techniques of example embodiments optimize the encoding in a manner that more accurately reflects human perception of video and thus yields video that is optimized more closely in line with better perceptual quality than conventional techniques. Simultaneously, example embodiments address issues in certain conventional SSIM-RDO techniques, by providing efficient and hardware-implementable implementations of the highly accurate but computationally complex RDO technique.

Example Deployment Environments

Figure 1:
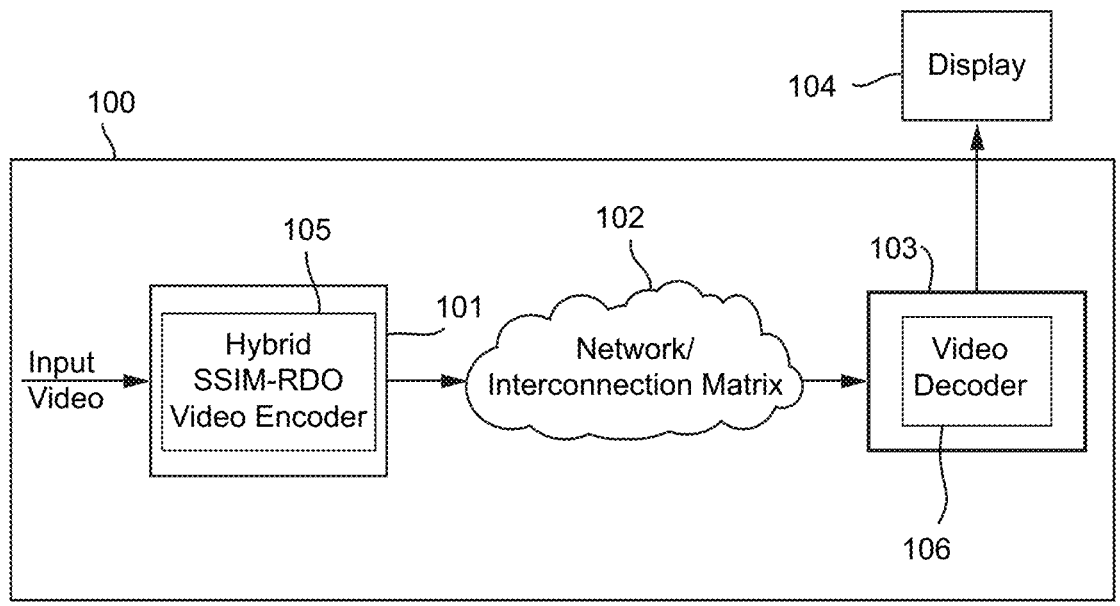
FIG. 1 illustrates a video transmission environment including a video encoder implementing hybrid SSIM-RDO, according to some example embodiments.

FIG. 1 illustrates an example environment in which certain embodiments may be implemented. Environment 100 includes a video sending device 101 which includes a hybrid SSIM-RDO video encoder 105, an interconnection network 102, and a video receiving device 103 including a video decoder 106. A display 104 may be connected to video receiving device 103. Video sending device 101 receives input raw video (e.g., uncompressed video) streams from one or more cameras or other video sources (not shown) and encodes the input raw video in the encoder 105 into compressed video according to a predetermined format for transmission. The encoder 105 encodes the input video using an encoding process such as that described in relation to FIGS. 2 and 4 below. The encoded video, transmitted over the interconnection network 102, is decoded in video decoder 106. The decoded video may be displayed on display 104 and/or may be stored on a digital storage device (not separately shown) for subsequent processing. In some embodiments, the compressed video may be stored for subsequent display and/or processing. In some embodiments, the encoder and decoder are capable respectively of sending and receiving video in a standard format such as, for example, and without—limited thereto, H.264. The encoder 105 is configured specifically, in addition to performing the processing required for encoding according to a selected encoding format such as H.264, to perform the hybrid SSIM-RDO. The decoder 106 is configured to handle (e.g., decode the video to an uncompressed form suitable for displaying on a display) video encoded according to the selected standard such as H.264, and may not (and does not require to) have additional features that are specifically-implemented to support hybrid SSIM-RDO. However, in some embodiments, the encoder 105 may implement the hybrid SSIM-RDO in a manner such that the decoder 106 is required to have additional features that are specifically-implemented to support hybrid SSIM-RDO.

According to some embodiments, the sending device 101 and the receiving device 103 are physically separate electronic devices connected by a communications network 102 such as the Internet, local area network, or a wide area network. The network 102 may include wired communication links and/or wireless communication links. In some embodiments, the devices 101 and 103 may be geographically separate. In some embodiments, the devices 101 and 103 may be separate but arranged relatively nearby each other, for example, within a vehicle (e.g., autonomous vehicle).

According to some other embodiments, the sending device 101 and the receiving device 103 are both on the same processing device such as a system-on-chip (SoC). In such embodiments, for example, environment 100 may be a SoC that may be used in applications such as for receiving video input from one or more cameras or other video sources and, after processing the video input in the SoC, displaying to a display device. In a particular example embodiment, the SoC may be integrated in an autonomous vehicle and may receive and process input from a plurality of cameras disposed throughout the vehicle. The SoC may then display a processed image to a dashboard or other display in the vehicle, may store the video for subsequent further processing and/or may transmit the encoded video to a remote location over a network.

Hybrid SSIM-RDO Video Encoding Process

Figure 2:
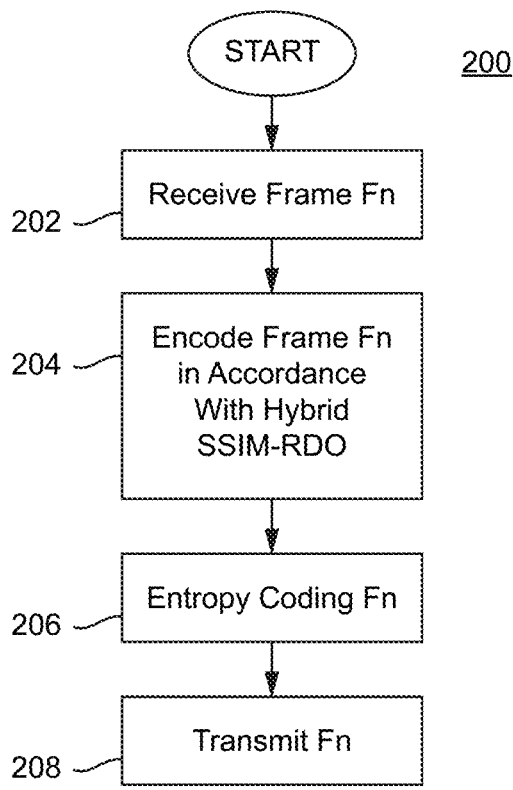
FIG. 2 illustrates a flowchart for a video encoding process implementing hybrid SSIM-RDO, according to some example embodiments.

FIG. 2 illustrates a flowchart for a video encoding process 200 implementing the hybrid SSIM-RDO according to some example embodiments. Video encoding process 200 may, for example, be implemented in a hybrid SSIM-RDO encoder, such as the encoder 105 shown in FIG. 1. The encoded video may be output to a network such as the network 102, and may be received and decoded by a decoder 106 that is also connected to the network.

The encoding process 200 may be entered at operation 202 when input raw video is received from one or more video sources. The input raw video may be video captured from one or more cameras or other sensors. In some embodiments the input raw video may be processor-generated (e.g., computer game output) and may or may not include camera or other sensor input.

The input raw video may be processed in operations 204-208 according to an encoding format such as, for example, H.264. Although H.264 is used in this disclosure as the primary video coding syntax with which embodiments are described, persons of skill in the art will understand that embodiments are not limited to H.264 as the encoding and/or the output video bit stream format. The teachings of this disclosure may also be applicable to other video encoding and/or bit stream formats such as, but not limited to, H.265, MPEG4, MPEG2, and/or any video encoding technique which requires selection of encoding modes for controlling the rate and/or distortion level.

At operation 204 the input video is encoded using the hybrid SSIM-RDO technique described in this disclosure. As described below, for example, in relation to FIGS. 3-4, the hybrid SSIM-RDO selects the optimal prediction mode (e.g., from among the many intra- and inter-prediction modes specified in the H.264 standard) for each block of a predetermined block type (e.g., macroblock) in a frame of input video according to which the block of the predetermined block type is transformed and quantized for the output video.

In the example non-limiting embodiments, a prediction mode provides a specification of which previously encoded group of pixels can be used to encode a subsequent block. The prediction mode may also specify the manner in which the specified group of previously encoded pixels is to be used to generate the predicted block. Each video encoding format (e.g., H.264, H.265, etc.) may define one or more prediction modes that can be used to generate predicted blocks consistent with that encoding format. As described below in relation to H.264, the set of prediction modes defined for a particular encoding format may include one or both of intra- and inter-prediction modes. After a predicted block is generated, as described in more detail below, the difference between the predicted block and the input block is represented in a residual block which may then be encoded and transmitted. The residual block contains all, or at least the majority, of the information that is eventually transmitted to the decoder regarding the content of the input block. Consequently, the video quality of the residual block is, at least to a large extent, determinative of the quality of the video that can be reproduced at the decoder. It then follows that, because the residual block is determined based partly on the predicted block and because the predicted block is determined based primarily on the prediction mode, the selection of the optimal prediction mode for each input block is a key aspect affecting the quality of the video that is reproducible at the decoder.

Figure 3:
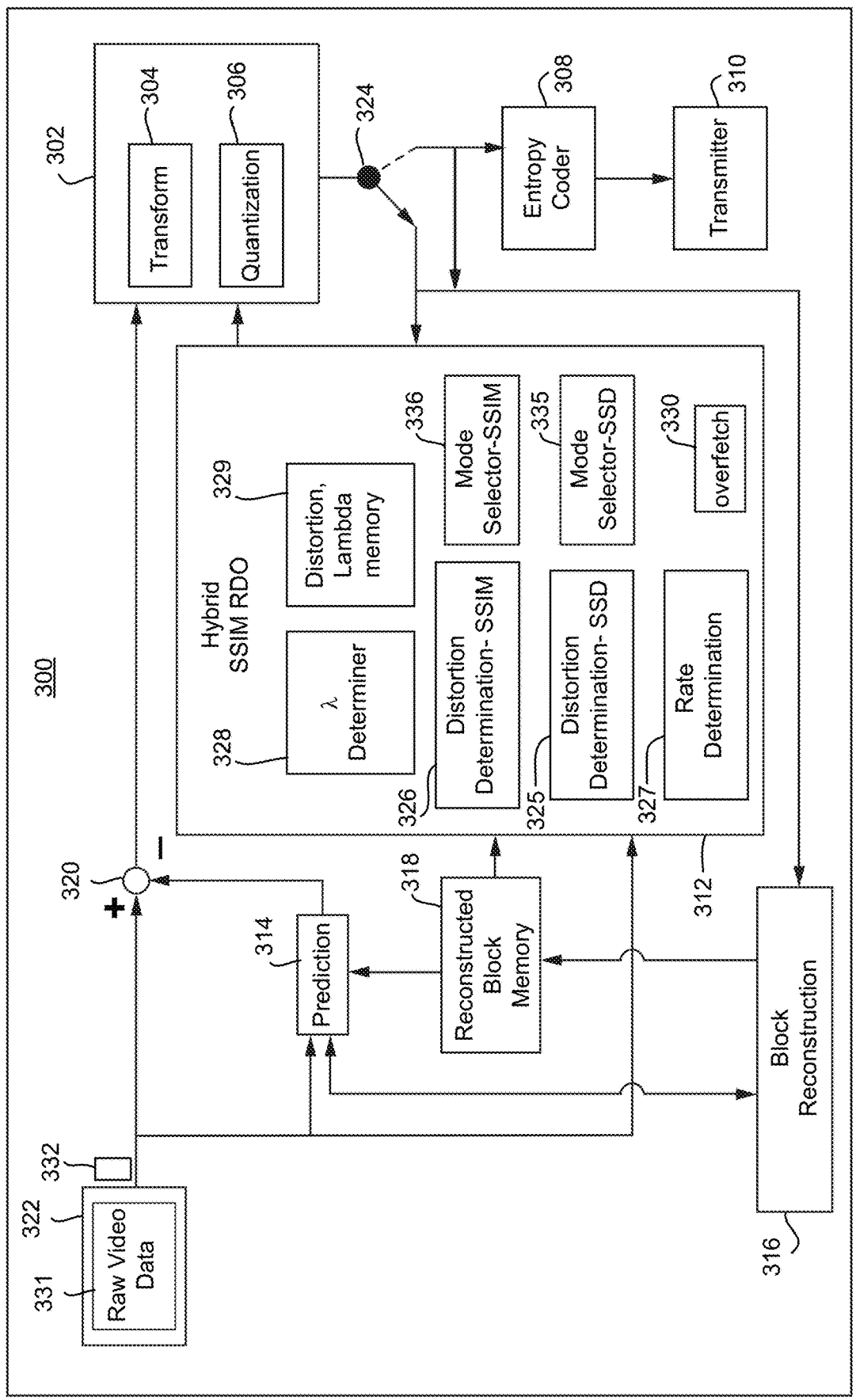
FIG. 3 is a block diagram of a video encoder implementing hybrid SSIM-RDO according to some example embodiments.
Figure 4:
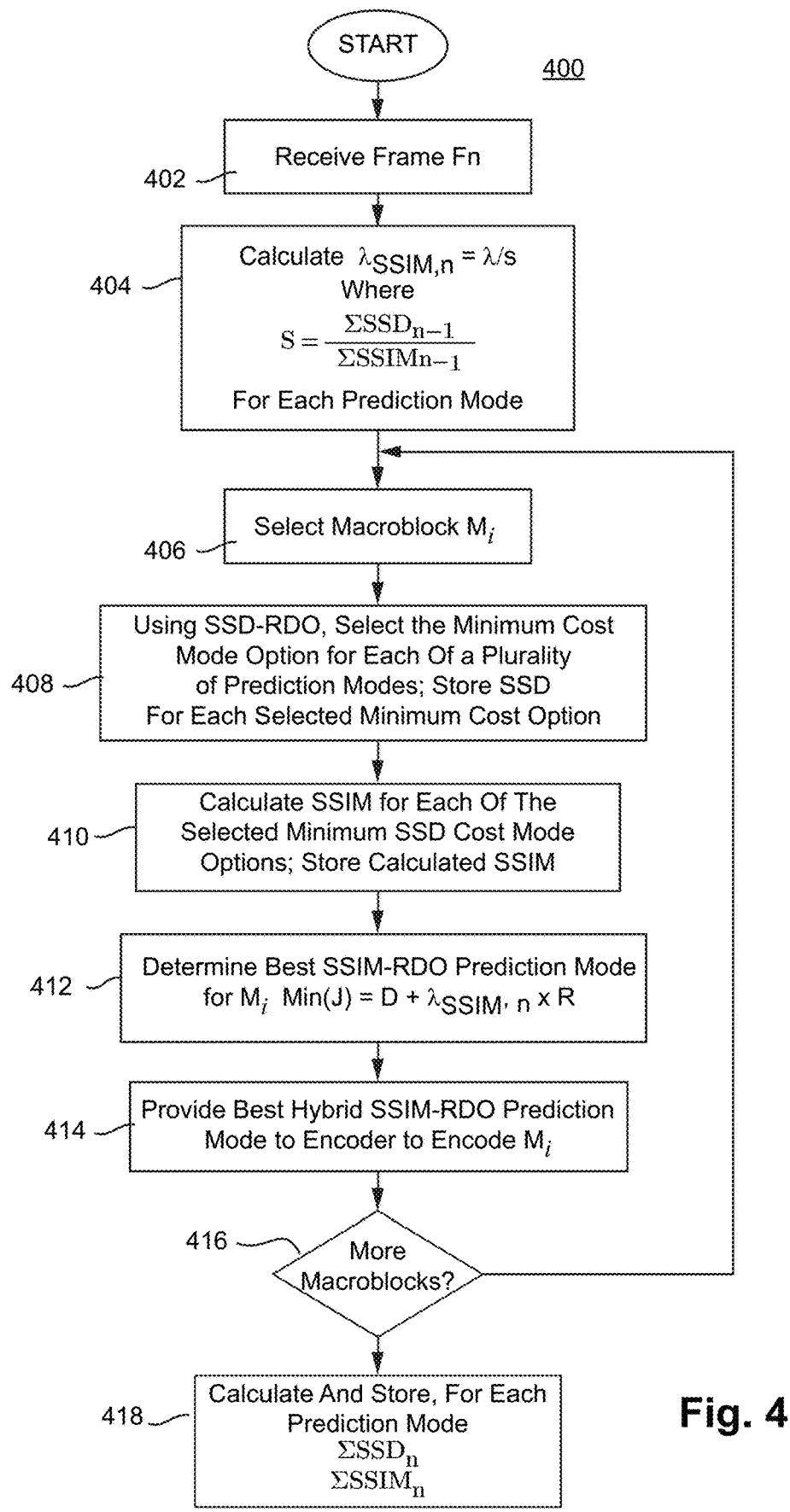
FIG. 4 illustrates a flowchart of a process by which a prediction mode is selected for a macroblock, according to some example embodiments.

In example embodiments, in order to encode a block of input video, the hybrid SSIM-RDO that is described in relation to FIGS. 3 and 4 may be used to efficiently evaluate a plurality of prediction modes and to select, as the optimal prediction mode, the prediction mode that yields the corresponding encoded residual block providing the best (and/or optimal) perceptual quality. A residual block corresponding to an input video block may then be generated using the selected prediction mode, and encoded.

At operation 206, the input video, encoded according to the hybrid SSIM RDO technique at operation 204, is entropy coded. The entropy coding includes performing a coding such as, for example, a variable length coding (e.g., VLC) or an Adaptive Binary Arithmetic Coding (e.g., CABAC) technique on the already transformed/quantized video.

At operation 208, the entropy coded frame is transmitted. In some embodiments, transmission of a sequence of frames in H.264 includes transmitting frames to form a group of pictures (GOP), which is a sequence of frames including one or more I-frames which are standalone encoded, P-frames that are forward predicted from the closest I- or P-frame, and B-frames which are bi-directionally predicted from closest past or future I- or P-frames. The encoded data may be mapped to a network abstraction layer to be transmitted on a network or other interconnection matrix in accordance with an appropriate transport layer format such as, for example, RTP/IP for wired or wireless communication, file formats such as MP4, H.32X conferencing, MPEG2, or the like.

According to at least some embodiments, the hybrid SSIM-RDO processing does not change the syntax structure of the encoded bit stream. That is, an encoder and a decoder configured for H.264 video bit streams of a certain set of H.264 profiles and levels are also capable of handling H.264 video bit streams whether or not that video is encoded using the hybrid SSIM-RDO described in this application. Alternatively, some embodiments may require the decoder to recognize, for example, based on a parameter in the received video bit stream, that the video bit stream is encoded using hybrid SSIM-RDO. For example, in some embodiments, the decoder may configure one or more settings for a display device differently (e.g., different levels of display quality) based on whether a parameter in the video stream indicates that a block or frame is encoded in accordance with SSIM-RDO. In some other embodiments, the decoder may change its own decoding configurations (e.g., optimize access to a subset of the available H.264 profiles and levels) based on whether or not the video bit stream is encoded according to SSIM-RDO.

Example Block Diagram of Encoder

FIG. 3 shows a block diagram of a video encoder 300 for implementing hybrid SSIM-RDO, according to some example embodiments.

Encoder 300 may include a transform coding section 302, an entropy coding section 308, a frame transmitting section 310, a hybrid SSIM-RDO section 312, a prediction section 314, a block reconstruction section 316, a reconstructed block memory 318, a raw video receive interface 322 and a residual signal generator 320. Persons of skill in the art will recognize that in some embodiments encoder 300 may not include one or more of the sections shown in FIG. 3, and/or may include one or more additional sections that are not shown in FIG. 3.

Raw video receiving interface 322 is configured to receive raw input video from one or more cameras and/or other video sources. The raw input video may be formed into frames, macroblocks and/or blocks in a memory of the receiving interface 322. An input raw video frame 331 of received raw video may be provided, a block 332 of a predetermined block type (e.g., a macroblock) at a time, to the prediction section 314, the residual signal generator 320, and to the hybrid SSIM-RDO section 312. Operations such as trimming/cropping, color conversion/correction and/or de-noising of the raw uncompressed video source data may be performed on the input frame or block before it is subjected to further processing in the encoder 300.

The processing of the input video frame in the encoder 300 may proceed block by block for each block of the predetermined block type in the input frame. In this disclosure a macroblock, as defined in H.264, is regarded as a block of the predetermined block type. In the H.264 standard, which utilizes the YCbCr color format, a macroblock comprises 16×16 block of Y (luminance data or "luma") data, and 8×8 blocks for each of Cb and Cr (chrominance data or "chroma") data. When a macroblock is transmitted, the data for the macroblock may be arranged as a macroblock header followed by data for respective blocks in the macroblock. Although a macroblock, by definition in H.264 includes a luma block and two chroma blocks, the use of the term macroblock in this disclosure may refer to any one or any combination of that luma block and the two chroma blocks.

The prediction section 314 operates to generate a predicted frame or predicted macroblock based on the input frame 331 and/or macroblock 332 from the receiving interface 322 and/or one or more previously reconstructed frames/macroblocks from reconstructed block memory 318. During the processing of an input frame 331 in the encoder 300, each block (e.g., macroblock 332) is spatially or temporally predicted. Spatial prediction (also referred to as intra-frame prediction) identifies a group of samples or blocks that contain similar characteristics (e.g., color, intensity, etc.), and uses a common representation for the respective samples or blocks of that group. Temporal prediction (also referred to as inter-frame prediction) predicts inter-frame motion based on one or more previous frames that may be retrieved from reconstructed block memory 318.

The predicted frames for each block are generated in accordance with a respectively selected prediction mode. In some embodiments, however, the selection of a prediction mode may be performed for a groups of one or more blocks.

H.264 defines many variations in the prediction modes from which to select one or more prediction modes that can be used to generate a predicted block. For intra-mode prediction, the current block is predicted by adjacent pixels in the upper and the left blocks that are decoded earlier in the same input frame. H.264 defines 9 intra-prediction modes for 4×4 luma blocks and 4 intra-prediction modes for 16×16 luma blocks. Each of the H.264 defined prediction modes specify a respectively different manner in which samples from an upper block and/or a left block are used in determining a predicted block.

Inter-mode prediction predicts blocks of an input frame based on the blocks in one or more previously occurring frames. For inter-mode prediction, seven modes of different partition sizes and shapes are specified in H.264.

H.264 defines several partition types for macroblock partitions within which each of the inter-prediction modes are evaluated. Each partition type is a block size for dividing a macroblock into one or more blocks (also referred to as "partitions" with respect to H.264 inter-prediction). Motion vectors are calculated for each of the partitions in the specified partition types. According to some embodiments, an SATD (sum of absolute transformed differences) score may be calculated for each motion vector, and the motion vectors with the least SATD score may be selected for each partition type. The inter-mode evaluations may then proceed with the selected motion vector for each partition type.

Some embodiments may also include a skip-mode where prediction of a block is skipped altogether and no information for that block is sent to the decoder. The decoder, which does not receive a residual for the skipped block, reconstructs the block from adjacent blocks. The encoder may choose skip-mode when the rate-distortion cost of the skip-mode is lower than any intra- or inter-mode.

The residual signal generator 320 operates to generate a residual macroblock of video data corresponding to the input video macroblock by, for example, subtracting a predicted macroblock (e.g., as determined by the prediction section 314) from the input macroblock. The difference in the macroblock information (i.e., the prediction error) between the input video macroblock and the predicted macroblock is referred to as the residual macroblock or the residual.

The residual macroblock generated by the residual signal generator 320 is input to the transform encoding section 302 which performs operations including transforming and quantizing the residual macroblock. The transform section 304 applies a transform to the residual macroblock to obtain a set of transform coefficients representing the content of that macroblock. For example, a discrete cosine transform (DCT) may be applied to the input video macroblock to obtain a corresponding transform macroblock of DCT coefficients. In some embodiments, a DCT transform may be applied to respective 4×4 blocks in the macroblock.

Whereas the transform section 304 transforms the residual to a set of transform coefficients, the quantization section 306 further compresses the set of transform coefficients of the frame by representing the coefficients with the minimum (or at least a lower) level of precision required to achieve the desired video quality. Many video coding standards, including, for example, H.264, employ uniform quantization where the coefficient space is considered as a set of equal sized intervals. However, non-uniform quantization may be used. The transform section 304 and the quantization section 306 both operate to transform the residual macroblock, on a block-by-block basis (e.g., processing successive 8×8 blocks within a 16×16 macroblock of luma information), into a more compact form.

The hybrid SSIM-RDO section 312 operates as the rate distortion optimizer that manages the distortion level and bitrate of the output video, and includes a rate determination section 327, an SSD distortion determination section 325, an SSIM distortion determination section 326, a lambda determining section 328, a memory 329, an over fetching section 330, a SSD mode identifier 335, and a SSIM mode identifier 336. The SSD distortion determination section 325 and the SSIM distortion determination section 326 may be referred to as a distortion determiner. The SSD mode identifier 335 and the SSIM mode identifier 336 may be referred to as a prediction mode identifier. The hybrid SSIM-RDO section 312 operates to perform SSD and SSIM calculations on original and reconstructed macroblocks and/or frames, to determine prediction modes according to SSD-RDO and according to SSIM-RDO. According to some embodiments, a copy of the raw video macroblock, a copy of the residual macroblock after transform and quantization but before reconstruction or entropy coding, and a copy of the reconstructed macroblock are received by the hybrid SSIM-RDO section 312.

In the example embodiments described with respect to FIG. 3, the distortion metrics (e.g., SSD and SSIM) are calculated in the pixel domain, for example, using the original macroblock (e.g., macroblock 332 before residual signal generator 320) before transformation and the reconstructed block after inverse transformation. It should, however, be appreciated that in some embodiments the distortion metrics can be calculated in the transform domain, for example, using a copy of the original macroblock after applying the transform and the reconstructed frame after inverse quantization but before applying inverse transformation.

A switch 324 may operate to provide the copy of the residual macroblock after transforming and quantizing to the hybrid SSIM-RDO section 312. For example, the switch may operate in one of two states: in a state of transmission the switch 324 may be configured to direct the macroblock to the entropy coder, and in a state of mode selection, the switch may be configured to direct the macroblocks to the hybrid SSIM-RDO section 312. During a state of mode selection, the switch 324 may thus direct the output of the quantization section 306 to the hybrid SSIM-RDO section 312 and to the block reconstruction section 316. The copy of the residual macroblock received at the block reconstruction section 316 is reconstructed by being subjected to inverse quantization and inverse transformation to obtain a reconstruction of the residual macroblock. The reconstruction of the residual macroblock may be subjected to motion compensation (if the residual was generated based on motion prediction) and/or inverse intra-prediction (if the residual was generated based on intra prediction) to then obtain a reconstruction of the input macroblock. The reconstruction of the input macroblock may be stored in block reconstruction memory 318.

As noted above, RDO techniques operate to select the most appropriate prediction mode while optimizing between video quality and bit rate. Conventional H.264 encoders are configured to test all available prediction modes by evaluating the cost associated with each mode, and then select the lowest cost mode. The cost may be based on the ratio of the incremental quality loss (e.g., determined using the difference of the distortion in original and reconstructed macroblocks/frames) and incremental bit savings (e.g., determined using the difference in bits needed to encode the original and the reconstructed macroblock/frame).

When SSIM is used as the distortion metric (when using SSIM to estimate distortion), due to the high computational complexity of SSIM, the computational cost/effort associated with the full mode decision of H.264 is too high for practical hardware implementation of real-time applications of video encoding. For example, one or more of the die-space, the cost for the required hardware circuitry, and/or the time required for the processing, would be prohibitive. The inventors observed from empirical studies that, in a large majority of the instances, the prediction mode that is selected by SSIM-RDO is also included among the top few prediction modes ordered according to SSD-RDO. The inventors also understood that this correspondence between the simpler SSD and more complex SSIM can be used to obtain the benefits of the more accurate SSIM-based mode selection while at the same time implementing the technique with substantially reduced costs and higher efficiency than the SSIM-based mode selection.

The video quality loss due to quantization can be managed using the hybrid SSIM-RDO. For example, the appropriate quantization parameter (QP) for quantization can be calculated based on a distortion metric calculated for the frame. In some embodiments, the QP and the Lagrange multiplier may be constant for all blocks of the video frame.

A copy of the transformed/quantized macroblock is received at the block reconstruction section 316 which may operate to perform inverse quantization, inverse transform, and/or motion compensation to generate a reconstructed frame corresponding to the input frame. The reconstructed frame/macroblock can subsequently be used for prediction etc. of subsequent frames. The motion compensation, for reconstruction, may be performed based on motion estimation information for that input frame as received from the prediction section 314.

The bitrate associated with the frame may be determined by the rate determination section 327 from the copy of the transformed and quantized residual macroblock. For example, the number of bits required for encoding the macroblock or another measure based on that number of bits can be determined as the rate associated with the macroblock. In some embodiments, the rate may be determined from the transformed and quantized macroblock after it is also subjected to entropy coding. For example, in such embodiments, instead of, or in addition to, receiving a copy of the transformed and quantized macroblock at the hybrid SSIM-RDO section 312, the hybrid SSIM-RDO section 312 will receive a copy of the transformed and quantized macroblock after it has been entropy coded at the entropy coding section 308.

The SSD distortion associated with the frame may be determined by the SSD distortion determining section 325. The SSD distortion may be determined as follows:

$$D_{SSD}=\Sigma_i(x_i-y_i)^2, \quad\quad\quad\quad \text{Equation 3}$$

where x, y are the two image regions (e.g., corresponding blocks in original macroblock and reconstructed macroblock) to be compared.

The SSIM distortion associated with the frame may be determined by the SSIM distortion determining section 326. As noted above, SSIM is a metric for testing and optimizing perceptual video quality, and accounts for higher-level structural information in the video content. In contrast to error-based metrics such as PSNR, which can be inconsistent with human eye perception, SSIM takes into account the human visual system. The SSIM index may be configured to be a decimal value between 0 and 1. A value of 0 implies zero correlation with the original image whereas a 1 implies the exact same image as the original image. The SSIM-based distortion metric, $D_{SSIM}$, may be calculated as follows:

$$D_{SSIM}(x, y) = \left(\frac{2\mu_x\mu_y + c_1}{\mu_x^2 + \mu_y^2 + c_1}\right)\left(\frac{2\sigma_x\sigma_y + c_2}{\sigma_x^2 + \sigma_y^2 + c_2}\right), \quad \text{Equation 4}$$

where $\mu_x$, $\mu_y$, $\sigma_x$, $\sigma_y$, $\sigma_{xy}$ are mean, standard deviation, and covariance of x and y respectively; $c_1$, $c_2$ are constants. $c_1$, $c_2$ in Equation 1 are constant, where $c_1=(k1\times L)^2$, $c_2=(k2\times L)^2$, k1=0.01, k2=0.03, L=255 for 8 bit sequence. The mean represents the luminance component of the comparison between x and y, the variance represents the contrast component, and the covariance represents the structure component. The mean, variance and covariance are calculated as follows:

$$\mu = \frac{\sum_{x,y} I(x, y)}{N} \qquad \text{Equation 5}$$

$$\sigma^2 = \frac{\sum_{x,y}(I(x, y) - \mu)^2}{N} \qquad \text{Equation 6}$$

$$\sigma_{xy} = \frac{\sum_{x,y} I_x(x, y) * I_y(x, y)}{N} - \mu_x \mu_y \qquad \text{Eqaution 7}$$

where N is the number of pixels in the block/frame for which $D_{SSIM}$ is calculated.

The above computations provide an SSIM metric with the following properties: symmetry (e.g., $D_{SSIM}(x, y) - D_{SSIM}(y, x)$); bondedness (e.g., $0 \leq D_{SSIM}(x, y) \leq 1$, the more close to 1, the better quality, and vice versa); and unique maximum (e.g., $D_{SSIM}(x, y) = 1$ if and only if x=y).

For ease of computation, in some example embodiments, dSSIM is calculated as follows from $D_{SSIM}$:

$$dSSIM = \Sigma_{i=0}^{9}(1 - D_{SSIM,i}) \qquad \text{Equation 8}$$

dSSIM enables reformulating the RDO to utilize minimizing of dSSIM rather than maximizing $D_{SSIM}$.

Conventional SSIM-RDO algorithms calculate $D_{SSIM}$ entirely within the current macroblock. That is, in conventional techniques the SSIM metric is calculated entirely within the boundaries of the 16×16 luma macroblock and/or the 8×8 chroma macroblocks. The inventors recognized that such calculation causes the appearance of noise artifacts (e.g., blocky artifacts) when the image resolution is large. This is because when image size is large, the texture within a macroblock tends to be smooth, and if $D_{SSIM}$ is calculated within the macroblock, the RDO process is likely to often be directed into a local minimal solution, and thereby introduce significant distortion at the macroblock boundary. To overcome this, example embodiments first extend both the original macroblock and the reconstructed macroblock using original pixels (e.g., pixels from the input raw video) for padding the macroblock pair, and then calculate $D_{SSIM}$ on the extended block pair. By calculating $D_{SSIM}$ in this manner, the distortion on macroblock boundaries is also considered during RDO.

Figure 6:
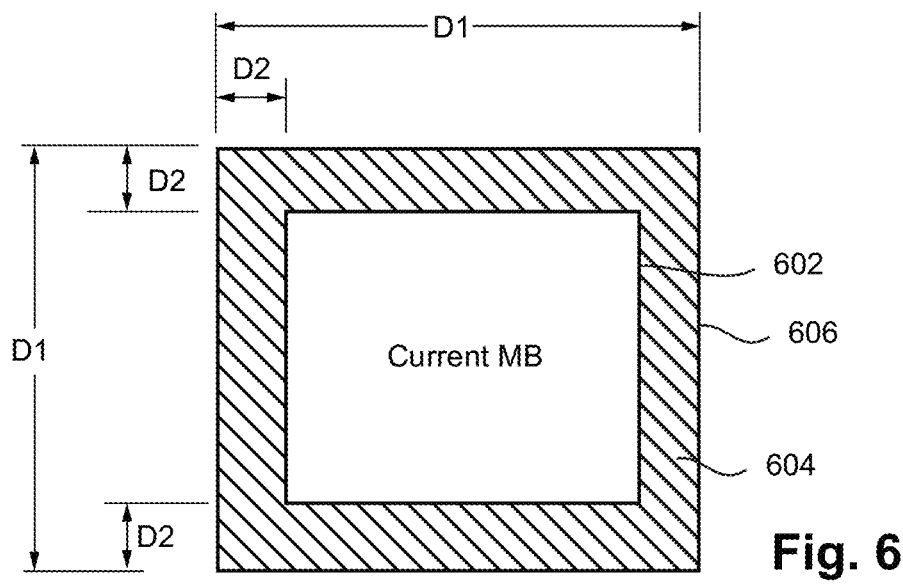
FIG. 6 illustrates a macroblock and an expansion of the macroblock made before calculating the distortion metrics for the macroblock, according to some example embodiments.
Figure 7:
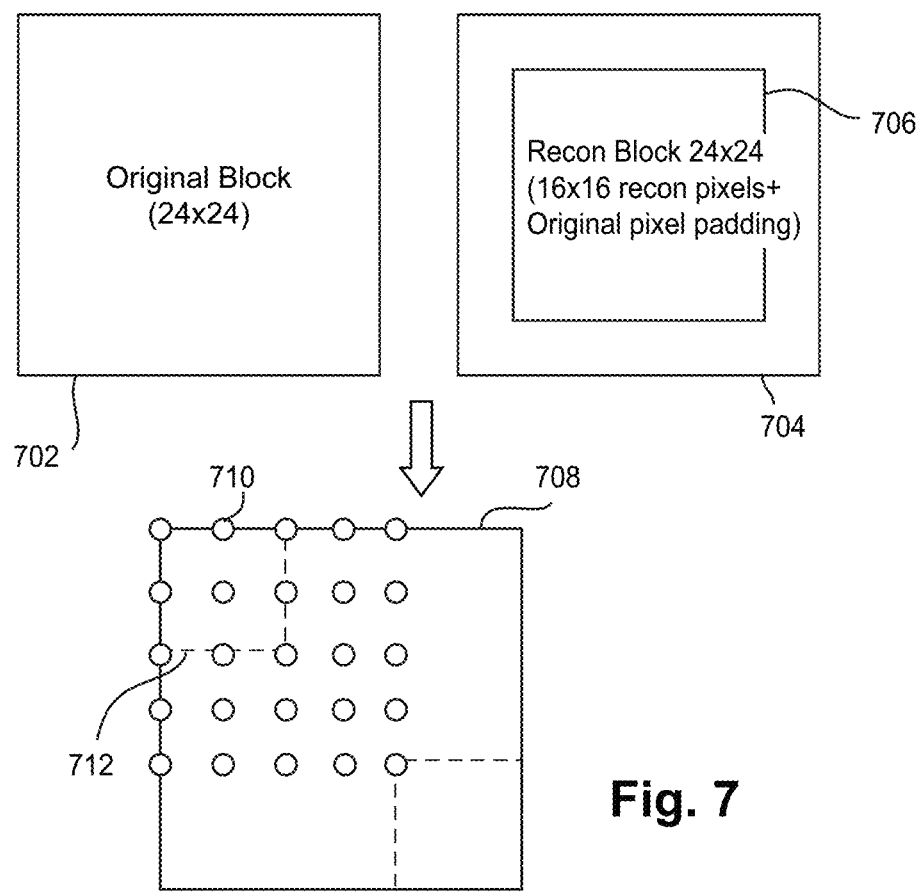
FIG. 7 is a graphical illustration of original and reconstructed luma macroblocks, and a sliding window used for the calculation of the distortion metrics, according to some example embodiments.
Figure 8:
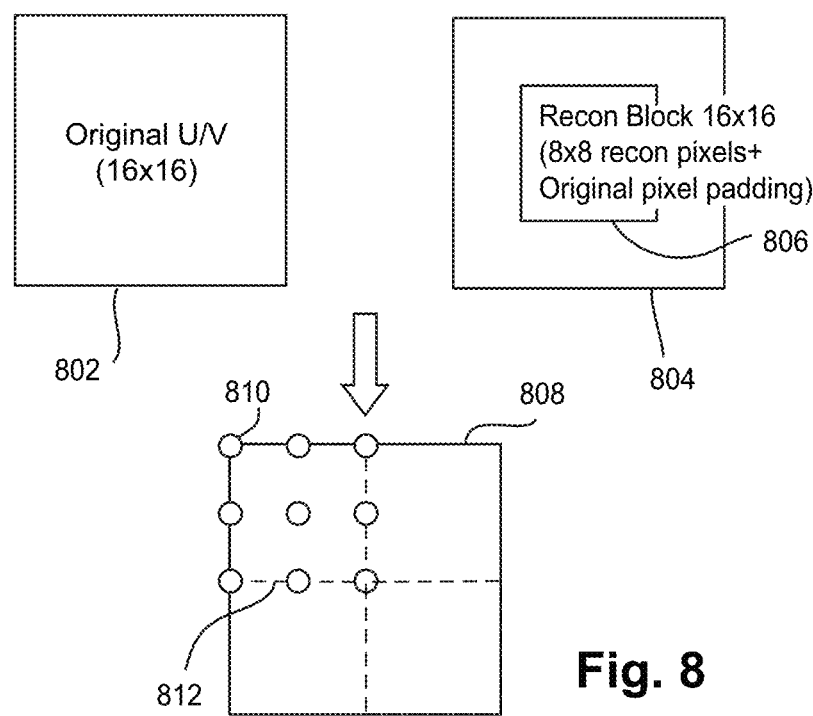
FIG. 8 is a graphical illustration of original and reconstructed chroma macroblocks, and a sliding window used for the calculation of the distortion metrics, according to some example embodiments.

Thus, in embodiments, the SSIM computation is performed on expanded macroblocks rather than the original-sized macroblocks. For example, a 16×16 luma block is expanded to 24×24, and a 8×8 chroma block is expanded to 16×16 before $D_{SSIM}$ is calculated for the macroblock. FIGS. 6-8 describe the expansion of macroblocks in more detail. The overfetch section 330 may include the logic to determine the type and size of the macroblock and to obtain padding pixels from the input video data, such as, from the receive interface 322. For example, the overfetch section 330 can determine the pixel positions of the padding pixels based upon the current macroblock's position in an input frame, and request the padding pixels.

The selection of the prediction mode for a macroblock may be made after evaluating the distortion produced by each of the prediction modes. As noted above, each prediction mode may include many variations that may also be individually evaluated for selection as the selected prediction mode for the macroblock. To reduce the implementation complexity of the technique to make hardware implementation efficient and feasible, the $D_{SSIM}$ is only calculated for the winner candidate of each prediction mode. SSD-RDO, which is substantially computationally simpler than SSIM-RDO, is used to determine the winner candidate of each prediction mode. For example, SSD mode identifier 335 may select the winner candidates for prediction modes using Equation 16 from among a set of prediction modes identified by default or by configuration. The calculation of the distortion metrics and selection of the prediction mode is further described below and in relation to FIG. 4. Example pseudo code for hardware implementation of $D_{SSIM}$ for a 8×8 block is shown in FIGS. 9A and 9B.

The Lagrange multiplier (herein also referred to as "lambda") for the frame can be calculated in lambda determining section 328. The lambda estimation is a significant aspect in SSIM-RDO. In many respects, the lambda has a significant effect on the bitrate savings gain etc., in SSIM-RDO. Unlike SSD-RDO where the rate-to-distortion curve can be written in an analytic manner, the relationship between $D_{SSIM}$ and rate is highly content dependent, thus making it difficult to estimate the optimal lambda. Conventional SSIM-RDO techniques use highly complex algorithms to decide the frame or macroblock level lambda. See, e.g., Shiqi Wang, et al. "*SSIM-Motivated Rate-Distortion Optimization for Video Coding*", IEEE Trans. On Circuits and Systems for Video Tech., 22.4 (2012):516-529.

In contrast to the lambda determination in the conventional SSIM techniques, the hybrid SSIM-RDO technique provides a computationally simple frame level updated lambda. The lambda determination technique in the hybrid SSIM-RDO technique is based on the following assumption: the winner candidate mode decided by SSD-RDO and SSIM-RDO should be similar in many cases (as PSNR and SSIM are highly corrected), and so if the $D_{SSIM}$ (or corresponding dSSIM) is scaled up to the similar magnitude of SSD, then $\lambda_{SSIM}$, which is the Lagrange multiplier associated with $D_{SSIM}$, should also be similar with $\lambda_{SSD}$, which is the Lagrange multiplier associated with $D_{SSD}$. Based on this, the simple frame-level lambda determining technique for frame n may be implemented as shown in Equation 9.

$$\lambda_{SSIM,n} = \lambda_{SSD}/s \qquad \text{Equation 9}$$

where the scaling factor s is calculated based on frame level $D_{SSD}$/dSSIM distortion as follows:

$$s_n = \begin{cases} s_0, & n = 1 \\ \left(\frac{s_{n-1} + s_{n-2}}{2}\right), & n > 1 \end{cases} \qquad \text{Equation 10}$$

$$s_n = \frac{\text{frame } n \text{ total } D_{SSD}}{\text{frame } n \text{ total } dSSIM} \qquad \text{Equation 11}$$

The inventors also observed that, at least in some embodiments, improved coding gain can be achieved by multiplying a scale factor to the $\lambda_{SSIM}$. This aspect is further described below in relation to FIG. 10. Based on the observations from the likes of FIG. 10, a scaling multiplier s' may be calculated to refine the calculated $\lambda_{SSIM}$:

$$\lambda_{SSIM,n}' = s' \times \lambda_{SSIM,n} \qquad \text{Equation 12}$$

where s' is related to motion in the sequence of video, and is proportional to motion intensity. In some example embodiments, the average motion vector statistics may be maintained for the processed macroblocks, and this information may be used to represent motion intensity. Moreover, in example embodiments, a linear relationship could be used for mapping average motion vector (average MV) to the scaling factor:

$$s' = a \times \|\text{average MV}\| + b \qquad \text{Equation 13}$$

where the constant a, b can be trained from sequences similar to the video being currently encoded. For example, different quality (e.g., bitstream reduction under the same SSIM score) from several sample videos may be obtained by changing a and b, and the a and b yielding the best quality (maximum bitstream reduction) can be selected for subsequent encoding.

The calculated distortion values and lambda values can be saved in the memory buffers 329.

The hybrid SSIM-RDO section 312 determines a final prediction mode for the macroblock. For example, SSIM mode identifier 336 may select the final prediction mode using an Equation 17 or 18 from among a subset of prediction modes identified as candidate prediction modes using SSD-RDO. The determination or selection of the final prediction mode is notified to the prediction section 314 and/or the transform encoding section 302. The prediction section 314 and/or the transform encoding section 302 then proceeds to obtain an encoding of the residual in accordance with the final prediction mode and to provide the residual encoded in accordance with the selected final prediction mode to the entropy coding section 308 for entropy coding and subsequent transmission.

In association with the encoded final prediction mode residual, information, such as the prediction mode and motion vectors (MVs), may also be provided to the entropy coder for transmission to a decoder. Such information may also be provided to the block reconstruction section 316 (for example, motion vectors may be provided from prediction section 314 to the block reconstruction section 316) for use in obtaining a reconstruction of the input video frame or macroblock.

The entropy coder 308 performs entropy coding on the frame. The quantized transform coefficients may be further processed (e.g., rounding, scanning, scaling, etc.) and then entropy encoded. Like the quantization steps, the number of bits assigned to coefficients may be uniform or non-uniform (e.g., such as, VLC). In addition to the transform coefficients, entropy encoding may be used to compress other syntax elements such as motion vectors and prediction modes.

The entropy coded frame is then processed and transmitted by the transmitter 310.

Example SSIM-RDO Process

FIG. 4 illustrates a flowchart of a process 400 for hybrid SSIM-RDO by which a prediction mode is selected for a macroblock, according to some example embodiments. Process 400 may be performed, for example, during the processing of operation 204 in process 200 described above. Process 400 may be performed, for example, by the hybrid SSIM-RDO section 312 in the encoder 300.

After entering process 400, at operation 402 frame n of raw (e.g., uncompressed) input video is received. The calculation of the distortion metrics may proceed macroblock-by-macroblock in frame n.

At operation 404, the hybrid SSIM Lagrange multiplier $\lambda_{SSIM}$ is calculated for frame n, based on the distortion metrics calculated for the previous frame (frame n−1). The $\lambda_{SSIM}$ is derived by adapting the Lagrange constant to provide content sensitivity to the metric. By this technique, and by updating the $\lambda_{SSIM}$ frame-by-frame, the SSIM-RDO for each frame is also made sensitive to the content of the previous frame. The following formula may be used in some embodiments to determine the $\lambda_{SSIM}$:

$$\lambda_{SSIM,n} = \lambda / s \text{ where } s = \frac{\sum SSD_{n-1}}{\sum SSIM_{n-1}} \qquad \text{Equation 14}$$

for each prediction mode.

The $D_{SSD}$ values and the $D_{SSIM}$ (and/or corresponding dSSIM) values for each macroblock of the previous frame n−1 may be obtained from a memory, such as, for example, memory 329 in FIG. 3.

In some other embodiments, the hybrid SSIM Lagrange parameter may be calculated as follows:

$$\lambda_{SSIM,n} = \lambda_{SSD,n} / ((S_{n-1} + S_{n-2})/2) \qquad \text{Equation 15}$$

where $S_{n-1}$=avg($D_{SSD}$ of frame n−1)/avg(dSSIM of frame n−1) and $S_{n-2}$=avg($D_{SSD}$ of frame n−2)/avg(dSSIM of frame n−2). Calculating using Equation 15 requires the maintaining of the SSD and SSIM values for macroblocks, or at least the average of such values, for the previous two frames. Additionally, Equation 15 also enables the $\lambda_{SSIM}$ to be more directly related to the $\lambda_{SSD}$.

Whereas operation 404 may be performed once for frame n, operations 406-416 are performed for each macroblock i of frame n.

At operation 406, a macroblock i is selected. The macroblocks in frame n may be processed in a predetermined sequence. For example, the macroblocks may be processed starting from the top left of the frame row by row left to right manner.

At operation 408, using SSD-RDO, the minimum cost mode option is selected for each of a plurality of prediction modes.

As described above in relation to the prediction section 312, some prediction modes may have more than one variation of that mode. For example, for intra mode prediction, H.264 defines 9 prediction modes for 4×4 luma blocks and 4 prediction modes for 16×16 luma blocks. For inter-mode prediction, seven modes of different sizes and shapes are specified in H.264.

For each prediction mode, the $D_{SSD}$ is determined for each of its variations, and the minimum SSD-RDO cost is determined as the SSD selected variant (referred to above as "winner candidate") for that prediction mode.

The $D_{SSD}$ for each variant can be calculated using Equation 3.

The SSD-RDO cost for each variant can be determined based on:

$$\min\{J_{SSD}\}, J_{SSD} = D_{SSD} + \lambda_{SSD} \times R, \qquad \text{Equation 16}$$

It is noted that the $D_{SSD}$ calculation for each variant can be performed using any known SSD-RDO technique.

For each prediction mode, the minimum SSD-RDO cost variant is selected as the representative (also referred to here as "winner candidate") for that prediction mode. Techniques for calculation of $D_{SSD}$ and for selection of minimum SSD-RDO cost prediction mode are known. An example SSD-RDO technique is in Sze, Vivienne, Madhukar Budagavi, and Gary J. Sullivan, "*High efficiency video coding (HEVC)*", *Integrated Circuit and Systems, Algorithms and Architectures*, Springer 39 (2014): 40, Section 11.6.3 "Hardware-Oriented Two-Step RDO Algorithm", which is hereby incorporated by reference.

The calculated $D_{SSD}$ values are stored. For example, they may be stored in a memory 329.

At operation 410, the $D_{SSIM}$ value is calculated for each of the selected minimum SSD cost prediction mode options. The number of prediction modes and/or the number of variants in each prediction mode for which $D_{SSIM}$ is calculated may be user configurable and/or statically or dynamically determined by the based on one or more factors such as, for example, processing capabilities and/or the video application's real time performance requirements. Thus, although in the example embodiment being described, for each prediction mode available to the encoder and the specific encoding format (e.g., H.264), the variant which has the minimum calculated SSD distortion is selected for also determining the $D_{SSIM}$, other embodiments may be configured so as to select more than one variant for each prediction mode. Equation 4 may be used to calculate the $D_{SSIM}$ value for each of the selected minimum SSD cost prediction mode options.

Calculation of the $D_{SSIM}$ value for a macroblock is described below in relation to FIGS. 6-8. As described therein, the $D_{SSIM}$ value is calculated for each of a block size area in the macroblock and then aggregated when all the blocks have been processed. Moreover, also as described therein, the $D_{SSIM}$ values are calculated on expanded macroblocks. Pixels from the input video data in addition to the pixels of the current macroblock, for use as padding pixels for generating the expanded macroblocks, may be obtained by the overfetch section 330.

The calculated $D_{SSIM}$ and/or corresponding dSSIM values are stored. For example, they may be stored in a memory 329.

At operation 412, the best SSIM-based prediction mode for $M_i$ is determined based on:

$$\min\{J_{SSIM}\}, J_{SSIM} = dSSIM + \lambda_{SSIM} \times R, \qquad \text{Equation 17}$$

Equation 17 can be rewritten as $$\min\{J_{SSIM}\}, \lambda_{SSIM} \times J_{SSIM} = \frac{1}{\lambda_{SSIM}} \times dSSIM + R \qquad \text{Equation 18}$$

Equation 18 formulates the minimization in a manner differently from SSD-RDO where λ is multiplied by R, and provides for λ to be multiplied by dSSIM. Because $\lambda_{SSIM}$ is typically very small (e.g., less than 1), passing $1/\lambda_{SSIM}$ to hardware is more efficient.

At operation 414, the best SSIM-based prediction mode is provided to the encoder to encode $M_i$. In some embodiments, the mode that has the lowest $J_{SSIM}$ according to Equation 17 may be selected as the best SSIM-based prediction mode. In some embodiments, two pipe stages may be used for the SSD-RDO and the SSIM-RDO processing in order to increase the throughput. Overall, in some example embodiments, the encoder is designed to complete operations 406-414 for one macroblock within 500 cycles for a 3840×2160 video (32400 MBs) at 60 frames per second at 1 GHz.

In response to the best prediction mode for macroblock $M_i$ being identified, the encoder then outputs macroblock $M_i$ after calculating the residual of the input macroblock $M_i$ with respect to a predicted macroblock predicted in the selected prediction mode. The residual macroblock is then transformed and quantized before being entropy coded.

At operation 416, it is determined whether more macroblocks are yet unprocessed. The decision at operation 416, enables selected operations of the process 400 to iterate so that each macroblock of the frame is processed to determine the best prediction mode for it.

At operation 418, calculate and store $\Sigma D_{SSD_n}$, and $\Sigma D_{SSIM_n}$ for each prediction mode. That is, $D_{SSD}$ and $D_{SSIM}$ are stored for each mode. In some embodiments, in addition to or in place of $D_{SSIM}$, dSSIM is calculated (see Equation 8 above) and stored.

After operation 418, the SSIM processing of frame n may be complete.

An encoder configured to perform selection of the prediction mode using the hybrid SSIM-RDO process 400 provides high performance as well as high quality gain.

The above described hybrid SSIM-RDO process enables an efficient implementation of SSIM-RDO, which is hardware-implementable and is compatible with real time applications. In the H.264 example described in relation to FIG. 4, instead of having to compute the highly complex SSIM metric for each of the many variants in each of the eight prediction modes, the hybrid SSIM-RDO technique enables a full prediction mode decision to be made by performing SSIM calculation only once for each of the eight prediction modes defined in H.264 (e.g., inter-mode for partition sizes 16×16, 16×8, 8×16 and 8×8, skip-mode, intra-mode 4×4, intra-mode 8×8, and intra-mode 16×16), and relies on the computationally simpler SSD-RDO to provide the SSIM computation with the best candidate for each prediction mode from among the many variants of that prediction mode.

In an example embodiment, the SSD-RDO process deciding the best candidate among variants for each prediction mode, the calculation of dSSIM for each prediction mode, and the selection of the best prediction mode based on dSSIM are implemented in hardware (e.g., hardware circuitry dedicated for SSIM computations in SSIM distortion determination section 326 and hybrid SSIM-RDO section 312), whereas the frame n's $D_{SSD}$/dSSIM calculation and the calculation of $\lambda_{SSIM}$ for frame n+1 are performed in software. The $1/\lambda_{SSIM}$ is passed into hardware. The hardware updates the $D_{SSD}$/dSSIM sum once done for each macroblock, so at the end of one frame, the software can get the total distortion statistics from hardware and calculate the corresponding lambda for the next frame. An advantage of this implementation in hardware is the low complexity, where software is merely required to get the distortion ratio between $D_{SSD}$/dSSIM and scale lambda.

Experimental results, which compared hybrid SSIM-RDO with SSD-RDO under the same perceptual quality, indicated that process 400 yields high quality (with a minimum level of distortion artifacts) for both small and large resolutions (e.g., QCIF~4K). This is in contrast to conventional SSIM-RDO techniques that are subject to significant blocky noise artifacts.

Example SoC Implementation

Figure 5:
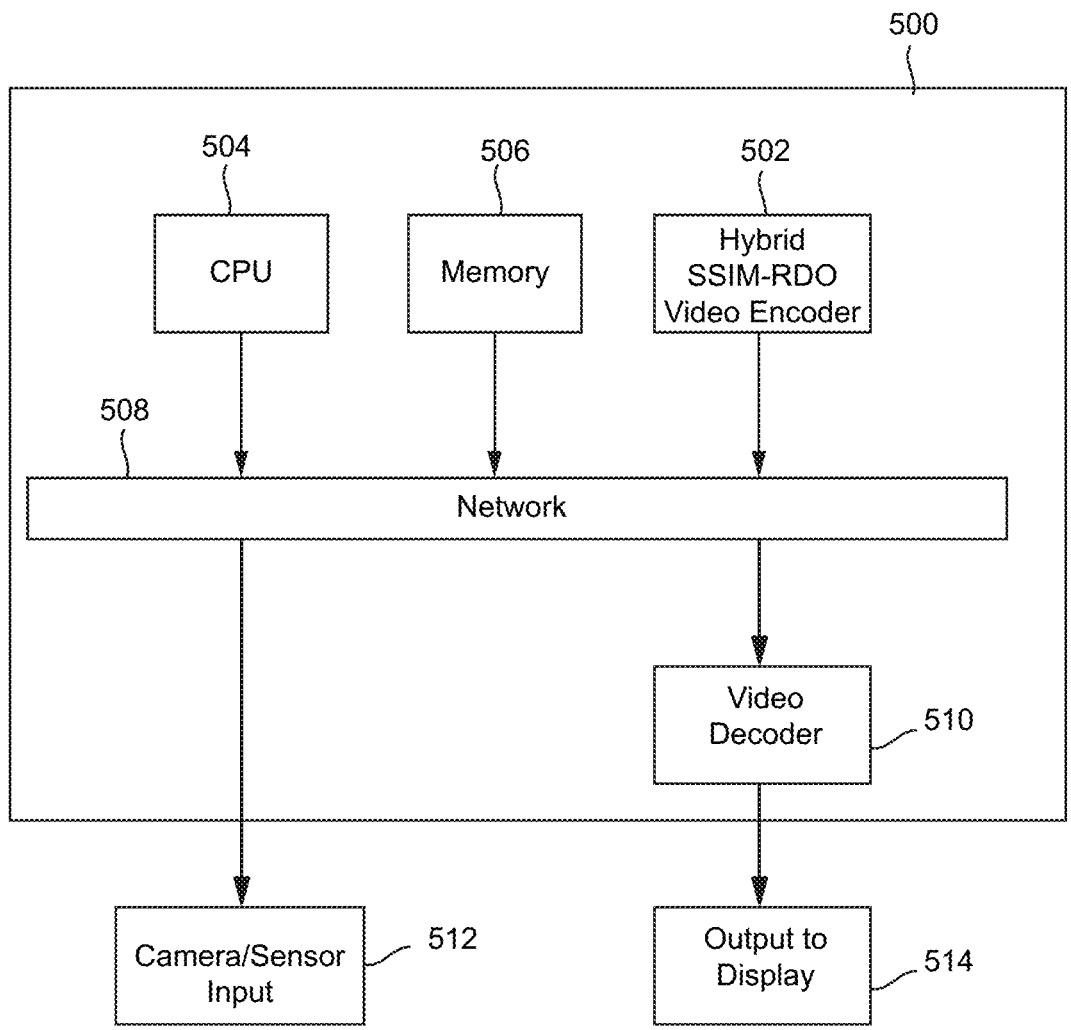
FIG. 5 illustrates a block diagram of a processor including a video encoder implementing hybrid SSIM-RDO, according to some example embodiments.

FIG. 5 illustrates a block diagram of an example processor or SoC 500 including a video encoder implementing hybrid SSIM-RDO, according to some example embodiments.

The SoC 500 includes, on a single chip, a hybrid SSIM-RDO video encoder 502, a CPU 504 and memory 506 interconnected by an interconnection matrix or network 508. In some embodiments, a video decoder 510 may be included in SoC 500. SoC 500 may include an input interface for receiving video data from camera and/or other sensors 512. The video decoder 510 may be connected to an output interface through which decoded video can be provided to a display 514.

The example SoC 500 may be deployed in various computing environments, and may be used in applications that drive displays, perform various control operations, perform other input/output, and/or perform computations. The example SoC may be deployed in an autonomous vehicle as a primary or backup controller to control the vehicle in real-time based on inputs received from multiple sources such as cameras, lidar, radar, ultrasonic sensors, GPS, speed sensors, inertial sensors, vehicle subsystems (e.g., braking subsystem, steering subsystem, propulsion subsystem, etc.). The SoC may use deep neural networks on one or more GPUs in the SoC to process sensor data and other inputs to generate commands to control the various subsystems of the vehicle during automated driving.

Hybrid SSIM-RDO video encoder 502 may be similar to the video encoder 300 described in relation to FIG. 3 and/or video encoder 105 described in relation to FIG. 5.

CPU 504 may include, for example, a commercially available CPU or other custom processor. The CPU, in some example embodiments, is primarily responsible for executing applications and overall control of the SoC 500. The CPU may include a single processing core or more than one processing core (a "multi-core" CPU). In some embodiments, SoC 500 may include more than one CPU.

Memory 506 may comprise a random access memory (RAM) such as dynamic RAM (DRAM), DDRAM or the like that provides for storage of instructions and data during the running of applications for access by the CPU 504 and/or other components of the SoC. Memory 506 may include register memory. Although not separately shown, SoC 500 may also include one or more persistent memories.

Interconnections or interfaces 508 includes one or more buses (also referred to as "data links") such as, for example, PCI Express (PCIE), NVLINK, USB, Thunderbolt, PCI, IDE, AGP etc. Interconnections 508 provide interconnectivity between, CPU 504, memory 506, interfaces to a display 514, interfaces to I/O devices 512 such as cameras and sensors etc., and any other devices attached thereto including devices external to SoC 500. Interconnections 508 may include buses of the same or different speeds, capacities and/or communication/transmission protocols. For example, high speed buses such as, PCIE, NVLINK, USB-C, Thunderbolt and the like, may connect the CPU and one or more video encoder 502 and video decoder 510 to each other and/or to system memory.

Video decoder 510 may be similar to video decoder 106 described in relation to FIG. 1 and may operate to receive and decode video encoded by video encoder 502. In some embodiments, upon setting up a video connection, the decoder 510 may signal the encoder 502 with the set of prediction modes which the decoder is capable of decoding. In response, the encoder 502 may operate to restrict its prediction mode selection to select only prediction modes that have been identified by the decoder. For example, upon receiving the notification from the decoder, the encoder may configure the initial set of prediction modes on which the SSD-RDO is run to only those prediction modes identified by the decoder, and/or may configure selected display device settings in accordance with the received notification.

One or more GPUs (not separately shown in FIG. 5) may process and render images for display on display 514. The rendered images may be based upon the decoded video from video decoder 510. In some embodiments, the GPU may perform other types of processing such as applications or portions of applications. In some embodiments, the one or more GPUs may be used to execute compute-intensive applications or portions of applications, or applications with parallel processing. In some cases, the GPU may execute a display list generated by the CPU 504 and/or stored in memory 506 to generate raw video data for encoding by the hybrid SSIM-RDO encoder 502 before transmission to a remote decoder or decoder 510 for display and/or storage. Data mining applications, weather predictions, neural networks, deep learning applications etc. are some example applications which may be performed wholly or in part in the GPU while generating images and/or video for encoding by encoder 502 and/or for display.

Example SSIM Distortion Calculation

FIG. 6 illustrates a macroblock 602 and a corresponding expanded macroblock 606, according to some example embodiments. The SSIM distortion $D_{SSIM}$ metric for macroblock 602 is determined based on corresponding expanded macroblock 606. The expanded macroblock 606 includes the original macroblock 602 and a predetermined amount of padding 604 in a region around the edges of the original macroblock. In an example embodiment, the predetermined number of pixels for padding may be an extension of 4 pixels on each side. Thus, for an example original macroblock 602 of size 16×16 pixels, the corresponding expanded macroblock 606 adds 4 pixels to each side resulting in an expanded macroblock of 24×24 pixels.

FIG. 7 is a graphical illustration of an expanded original macroblock 702 and an expanded reconstructed macroblock 704 representing luma pixels, and a sliding window 712 used for the calculation of the SSIM distortion metric, according to some example embodiments. As noted above, the expanded original macroblock is generated by expanding the original macroblock of 16×16 luma pixels (the unexpanded original macroblock is not shown). Likewise, the expanded reconstructed macroblock 704 of 24×24 pixels is generated by expanding the actual reconstructed macroblock 706 which is of 16×16 luma pixel size by adding padding pixels on each side. The expansion of the 16×16 reconstructed macroblock is achieved by adding corresponding pixels from the expanded original macroblock. That is, for a pair of expanded original macroblock and the corresponding expanded reconstructed macroblock, the same pixels are used as padding. That is, the expansion pixels added to the reconstructed macroblock are the same pixels from the expansion area of the corresponding original macroblock. In example embodiments, the padding pixels are pixels from that are adjacent to the original macroblock in the input video data.

When calculating the $D_{SSIM}$ value for each of the original and reconstructed macroblocks, the corresponding expanded original and the expanded reconstructed macroblocks (e.g., as represented by 708) are used. The calculation proceeds by consecutively considering blocks (e.g., 8×8 blocks, as illustrated by the block 712) in a sliding window 712 manner. Each position 710 represents the top left edge position of the sliding window block. Thus, the sliding window is moved in a manner that includes overlap among respective measurement blocks.

The padding is for calculating $D_{SSIM}$ on macroblock boundaries. The padding enables minimizing blocky artifacts that are often observed in large images. For large image dimensions, the variance of one macroblock is usually small, and if the distortion is calculated strictly within the macroblock, SSIM-RDO may tend to get stuck at a local minimum, often causing severe blocky effects. This effect is more likely to happen in Gamming sequences and when the QP is large.

Thus, as shown in FIG. 7, using the expanded macroblocks, each SSIM score is calculated within an 8×8 window, yielding 25 scores in total for a luma macroblock. Likewise, a total of 9 scores calculated within respective 8×8 windows are obtained for each chroma macroblock (chroma macroblock is shown in FIG. 8). The aggregate SSIM scores for the 25 (9 for chroma) positions represents the $D_{SSIM}$ distortion for the macroblock.

FIG. 8 is a graphical illustration of expanded original 802 and expanded reconstructed 804 chroma macroblocks, and a sliding window 812 used for the calculation of the respective SSIM scores for overlapping blocks 812, according to some example embodiments. The sliding window 812 moves to each indicated position 810 while calculating the $D_{SSIM}$ for the macroblock 808. $D_{SSIM}$ for the macroblock 808 is the sum of the SSIM scores calculated at respective positions of the sliding window 812.

Example SSIM Pseudo Code

FIGS. 9A and 9B illustrate example pseudo code for calculating SSIM on a block of pixels within a macroblock according to some example embodiments. In combination with using SSD-RDO to select a subset of prediction modes to evaluate using SSIM, the example pseudo code shown in FIGS. 9A and 9B illustrate an efficient implementation of calculating $D_{SSIM}$ in hardware in implementing the hybrid SSIM-RDO technique.

The pseudo code shown in FIGS. 9A-9B provides a hardware-implementable implementation of Equation 4.

Control of Lagrange Multiplier

Figure 10:
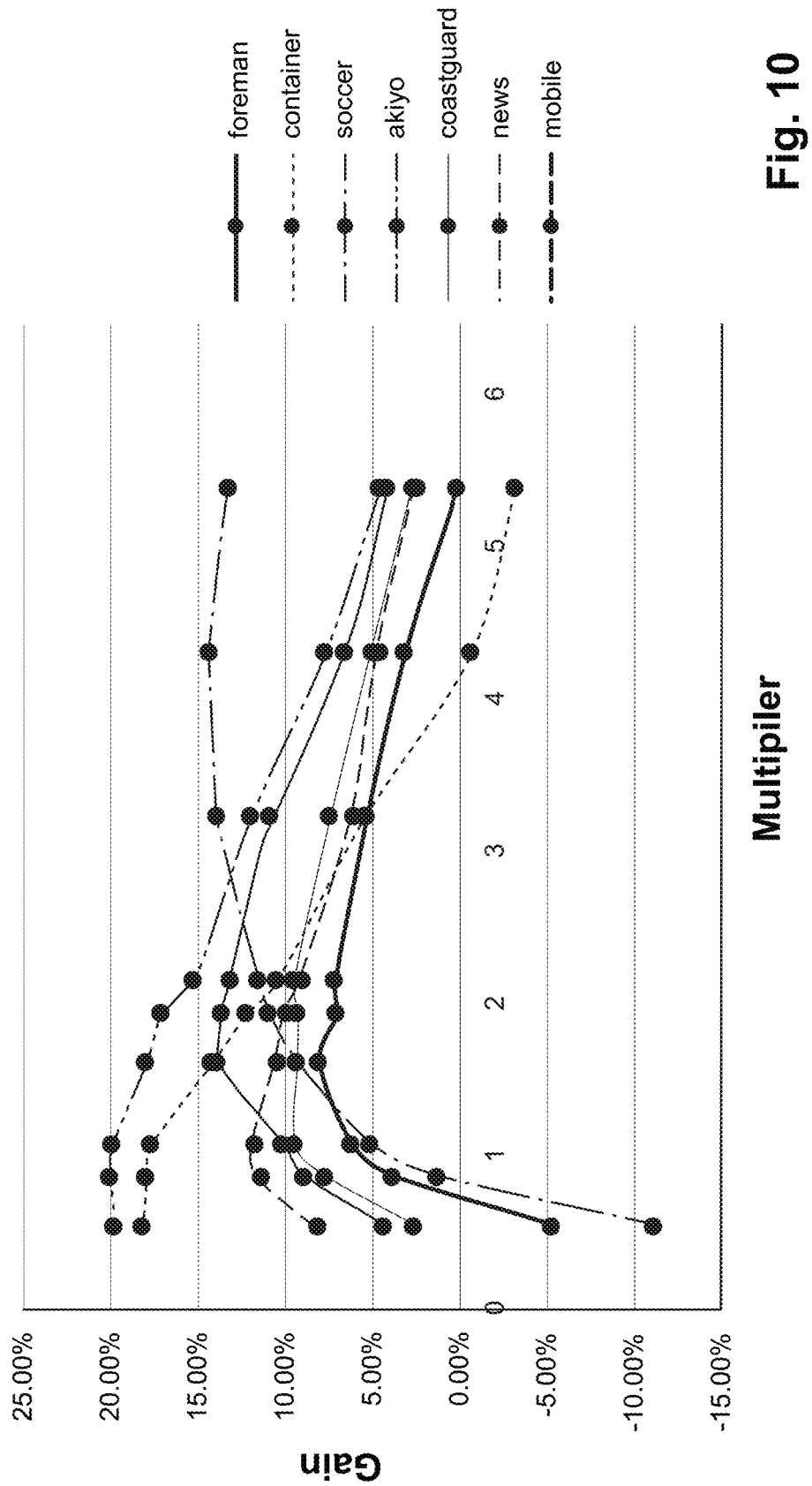
FIG. 10 illustrates a relationship between gain and a scaling factor for the SSIM Lagrange multiplier, according to an example embodiment.

FIG. 10 shows example experiment results of changing the Lagrange multiplier $\lambda_{SSIM}$ on several Common Intermediate Format (CIF) sequences. In this experiment, different coding gains were achieved by varying the estimated $\lambda_{SSIM}$ from 0.5× to 4×. The result shows the estimated $\lambda_{SSIM}$ could be far away from optimal, e.g., the optimal $\lambda_{SSIM}$ is nearly 4× of the estimated value. The observed coding gain is 5% (1×) vs. 14% (4×).

A key observation in FIG. 10 is that for different sequences, the Lagrange multiplier vs. gain curve is different. For example, for akiyo and container sequences, the gain decreases when the multiplier becomes large; while for the soccer sequence, the gain increases with multiplier. An important difference between them is the motion intensity. Specifically, for container and akiyo sequences, there is little motion in the sequence, and the scene almost remains still, whereas for the soccer sequence, the scene changes dramatically over time.

Based on the observations from FIG. 10, a scaled Lagrange multiplier $\lambda_{SSIM,n}'$ can be determined, for example, using Equations 12 and 13 above. $\lambda_{SSIM,n}'$ may yield higher gain when the scaling factor s' is selected (see Equation 13 above) in a manner suitable for the characteristics (e.g., motion characteristics) of the input video data.

Example Illustrative Video Images

Figure 11A:
FIGS. 11A and 11B illustrate a first example video frame processed with SSIM calculated within each macroblocks and SSIM calculated in the expanded macroblocks, respectively.
Figure 11B:

FIG. 11A illustrates a first example video frame processed with SSIM-RDO performed with SSIM being calculated entirely within a macroblock, and FIG. 11B illustrates the same frame processed with SSIM-RDO but with SSIM being calculated on expanded macroblocks as described in FIGS. 6-7. Substantial blocky noise artifacts are visible in FIG. 11A near the center of the bottom edge of the image. These artifacts are significantly reduced and almost eliminated in FIG. 11B when the SSIM distortion metric is calculated with respect to the expanded macroblock.

Figure 12A:
FIGS. 12A and 12B illustrates a second example video frame processed with SSD-RDO and processed with hybrid SSIM-RDO according to an example embodiment, respectively.
Figure 12B:

FIG. 12A illustrates an example video frame processed with SSD-RDO, and FIG. 12B illustrates the same frame processed with the hybrid SSIM-RDO according to an example embodiment. The former is H.264 encoded with SSD-RDO and has a bitrate of 1.78 Mbps and SSIM of 0.86. The latter is H.264 encoded with hybrid SSIM-RDO and has a bitrate of 1.75 Mbps and SSIM of 0.88. In FIG. 12A it can be observed that the handrails are almost wiped out in several places in the SSD-RDO image. However, in FIG. 12B show clearer handrails.

Figure 13A:
FIGS. 13A and 13B illustrates a third example video frame processed with SSD-RDO and processed with hybrid SSIM-RDO according to an example embodiment, respectively.
Figure 13B:

FIG. 13A illustrates an example video frame processed with SSD-RDO, and FIG. 13B illustrates the same frame processed with the hybrid SSIM-RDO according to an example embodiment. The former is H.264 encoded with SSD-RDO and has a bitrate of 1.78 Mbps and SSIM of 0.86. The latter is H.264 encoded with hybrid SSIM-RDO and has a bitrate of 1.75 Mbps and SSIM of 0.88. In FIG. 13A it can be noticed that the strips on the wall are blurred in the SSD-RDO image. In contrast, FIG. 13B show sharper strips on the wall.

The hybrid SSIM-RDO techniques described in this disclosure has high performance and high quality gain. Unlike conventional techniques, the hybrid SSIM-RDO performs well for both small and large resolutions (e.g., QCIF~4K). In experiments to measure the quality gain, the bitrate savings percentage of the hybrid SSIM-RDO technique was compared with that of SSD-RDO under the same perceptual quality for a gaming video sequence and for a natural video sequence. The bit rate savings were measured at several bitrates and at several resolutions. The hybrid SSIM-RDO resulted in bitrate savings of 10.27% for gaming and of 10.65% for natural video.

Although the example embodiments were described primarily with respect to H.264 as the encoding technique and/or encoded video bit stream syntax, embodiments are not limited thereto. Persons of skill in the art will understand that the teachings of this application can be applied to other encoding techniques and/or encoded video bit stream syntaxes where multiple prediction and/or encoding formats are evaluated in order to select a most suitable encoding of video and/or audio. It will also be appreciated that, although SSD and SSD-RDO is used in the described examples to select winner candidates from available prediction modes, other distortion estimation techniques can be used in addition to, or in place of, SSD and SSD-RDO. Persons of skill in the art will also understand that while the described hybrid SSIM-RDO technique is designed to be hardware-implementable as described in detail above, example embodiments may utilize various amounts of software for implementing the technique, and such software may be embodied in computer code stored in a disk drive, flash memory or other non-transitory computer readable storage device.

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

While the invention has been described in connection with what is presently considered to be the most practical and preferred embodiments, it is to be understood that the invention is not to be limited to the disclosed embodiments. As an example, while the discussion above has been presented using certain hardware as an example, any type or number of processor(s) can be used. On the contrary, is intended to cover various modifications and equivalent arrangements included within the spirit and scope of the appended claims.

The invention claimed is:

1. A video encoder comprising:
   a distortion estimator that calculates a first distortion of a block of pixels by a set of prediction modes that includes a set of inter prediction modes and a set of intra prediction modes, selects, based on the calculated first distortion, a subset of the set of prediction modes, and uses structured similarity (SSIM) distortion estimation to calculate a second distortion of the block of pixels for each prediction mode in the selected subset, wherein, for each prediction mode in the set of prediction modes, the calculation of the first distortion is based on a first type of distortion estimation different from said SSIM distortion estimation; and
   a prediction mode identifier that identifies one of the prediction modes in the subset for use in encoding the block of pixels based on the calculated SSIM distortions of the block of pixels for each prediction mode in the selected subset and bit rates for encoding the block.

2. The video encoder according to claim 1, wherein the distortion estimator is configured to form an expanded block including the block and a region of additional pixels, and perform the calculating using SSIM distortion estimation within the expanded block including in the region of additional pixels.

3. The video encoder according to claim 1, wherein the prediction mode identifier is configured to determine (1) a multiplier based on distortion values from at least one previous frame of input video, wherein said distortion values from at least one previous frame includes distortion values determined according to the first type of distortion estimation and distortion values determined according to the SSIM distortion estimation, and (2) perform said identifying based on at least the calculations using SSIM distortion estimation, the bit rates, and the multiplier.

4. The video encoder according to claim 3, wherein the prediction mode identifier is further configured to scale the multiplier according to at least one characteristic of the input video; and perform said identifying based on at least the estimations using SSIM distortion estimation, the bit rates, and the scaled multiplier.

5. The video encoder according to claim 1, the distortion estimator uses sum of squared difference (SSD) distortion estimation as the first type of distortion estimation to calculate distortion of the block of pixels by the set of prediction modes.

6. The video encoder according to claim 1, wherein the distortion estimator and the prediction mode identifier are provided on a system-on-chip (SoC).

7. The video encoder according to claim 1, wherein the distortion estimator and the prediction mode identifier include hardware circuitry dedicated to calculating distortion of the block of pixels by the set of prediction modes using the first type of distortion estimation, selecting, based on the calculated distortion, the subset of the set of prediction modes, and using SSIM distortion estimation to calculate distortion of the block of pixels for each prediction mode in the selected subset.

8. A method for controlling picture quality and/or bit rate of an outgoing video stream, the method executed by an electronic processing system and comprising:
   calculating, using a first type of distortion estimation on a block of pixels from a frame of input video, first distortion values for each of a first plurality of prediction modes, wherein the first plurality of prediction modes includes a set of inter prediction modes and a set of intra prediction modes;
   selecting, based at least on the first distortion values, a second plurality of prediction modes, wherein the second plurality is a subset of the first plurality of prediction modes;
   calculating, using structured similarity (SSIM) distortion estimation on the block, second distortion values for each prediction mode in the second plurality of prediction modes, wherein the first type of distortion estimation is different from the SSIM distortion estimation;
   identifying, based on the second distortion values and bit rates for encoding the block according to respective ones of the second plurality of prediction modes, a prediction mode for encoding the block;
   encoding the block using the identified prediction mode; and
   transmitting the encoded block in the outgoing video stream.

9. The method according to claim 8, wherein the calculating second distortion values comprises forming an expanded block including the block and a region of additional pixels, and performing the calculating within the expanded block including in the region of additional pixels.

10. The method according to claim 9, wherein forming the expanded block includes padding the block with the additional pixels from the frame of input video, and wherein calculating the second distortion values further comprises:
    expanding, by padding using the additional pixels, a reconstructed block derived from the block; and
    performing the calculating of the second distortion values based on the expanded block and the expanded reconstructed block.

11. A method according to claim 10, wherein said calculating the second distortion values based on the expanded block and the expanded reconstructed block comprises:
    determining, in each of the expanded block and the expanded reconstructed block, SSIM distortion scores for a set of sub-blocks, wherein each sub-block partially overlaps with at least one other sub-block; and
    determining the second distortion values based on the determined SSIM distortion scores.

12. A method according to claim 8, wherein said calculating the second distortion values comprises:

determining, in each of the block and a reconstructed block, SSIM distortion scores for a set of sub-blocks, wherein each sub-block partially overlaps with at least one other sub-block; and determining the second distortion values based on the determined SSIM distortion scores.

13. A method according to claim 8, wherein identifying a prediction mode for encoding the selected block comprises:

determining a multiplier based on distortion values from at least one previous frame of input video; and performing said identifying based on at least the second distortion values, bit rates, and the multiplier.

14. A method according to claim 13, wherein identifying a prediction mode for encoding the selected block further comprises:

scaling the multiplier according to at least one characteristic of the input video; and performing said identifying based on at least the second distortion values, bit rates, and the scaled multiplier.

15. A method according to claim 13, wherein said determining the multiplier includes determining the multiplier based on distortion values determined according to the first type of distortion estimation and distortion values determined according to the SSIM distortion estimation.

16. A method according to claim 13, wherein said distortion values from at least one previous frame includes distortion values from two successive previous frames.

17. A method according to claim 13, wherein the multiplier is recalculated frame-by-frame.

18. A method according to claim 8, wherein the first type of distortion estimation includes sum of squared difference (SSD) distortion estimation.

19. A method according to claim 8, wherein the number of prediction modes selected to the second plurality is configurable.

20. A method according to claim 19, wherein the set of inter prediction modes includes a respective plurality of inter prediction modes for each of a plurality of partition types and the set of intra prediction modes includes a respective plurality of intra prediction modes for each of a plurality of block sizes, and wherein said selecting a second plurality of prediction modes comprises selecting at least one inter prediction mode for each of the partition types and at least one intra prediction mode for each of the block sizes.

21. A non-transitory computer readable storage medium having instructions stored thereon that, when executed by processing circuitry, causes the processing circuitry to performing operations comprising:

calculating, using a first type of distortion estimation on a block of pixels from a frame of input video, first distortion values for each of a first plurality of prediction modes, wherein the first plurality of prediction modes includes a set of inter prediction modes and a set of intra prediction modes;

selecting, based at least on the first distortion values, a second plurality of prediction modes, wherein the second plurality is a subset of the first plurality of prediction modes;

calculating, using structured similarity (SSIM) distortion estimation on the block, second distortion values for each prediction mode in the second plurality of prediction modes, wherein the first type of distortion estimation is different from the SSIM distortion estimation;

identifying, based on the second distortion values and bit rates for encoding the block according to respective ones of the second plurality of prediction modes, a prediction mode for encoding the block; and encoding the block using the identified prediction mode.

22. A video decoder comprising:

a video receiver that decodes a video stream including a block of pixels encoded using a prediction mode from an identified set of prediction modes compatible for decoding, the block of pixels being encoded by a video encoder that calculates a first distortion of the block by each prediction mode of the set of prediction modes compatible for decoding, selects, based on the calculated first distortion, a subset of the set of prediction modes, uses structured similarity (SSIM) distortion estimation to calculate a second distortion of the block of pixels for each prediction mode in the selected subset, and identifies one of the prediction modes in the subset for use in encoding the block based on the estimation and bit rates for encoding the block, wherein, for each prediction mode in the set of prediction modes, the calculation of the first distortion is based on a first type of distortion estimation different from said SSIM distortion estimation, and wherein set of prediction modes includes a set of inter prediction modes and a set of intra prediction modes; and at least one of a decode capability identifier that identifies to the video encoder the set of prediction modes compatible for decoding, and a prediction-dependent configurator that changes a configuration in the video decoder in response to receiving an indication of the SSIM distortion estimation from the video encoder.

* * * * *